United States Patent
Kim et al.

(10) Patent No.: US 7,720,109 B2
(45) Date of Patent: May 18, 2010

(54) ONE-WAY DELAY TIME ESTIMATION METHOD AND APPARATUS AND CLOCK SYNCHRONIZATION METHOD AND APPARATUS USING THE SAME

(75) Inventors: Dong-keun Kim, Gunpo-si (KR); Jai-yong Lee, Seoul (KR)

(73) Assignees: Samsung Electronics Co., Ltd., Suwon-Si (KR); Industry-Academic Cooperation Foundation, Seoul (KR)

( * ) Notice: Subject to any disclaimer, the term of this patent is extended or adjusted under 35 U.S.C. 154(b) by 615 days.

(21) Appl. No.: 11/601,759

(22) Filed: Nov. 20, 2006

(65) Prior Publication Data
US 2007/0116064 A1 May 24, 2007

(30) Foreign Application Priority Data
Nov. 22, 2005 (KR) ............... 10-2005-0112003

(51) Int. Cl.
*H04J 3/06* (2006.01)
(52) U.S. Cl. .................... 370/508; 370/519
(58) Field of Classification Search .......... 370/508, 370/519, 294, 512, 252
See application file for complete search history.

(56) References Cited

U.S. PATENT DOCUMENTS

| 4,569,042 A | * | 2/1986 | Larson ............ 370/250 |
|---|---|---|---|
| 6,366,762 B1 | | 4/2002 | Miller et al. |
| 6,434,606 B1 | * | 8/2002 | Borella et al. ............ 709/214 |
| 6,445,681 B1 | | 9/2002 | Pogrebinsky |
| 7,492,720 B2 | * | 2/2009 | Pruthi et al. ............ 370/252 |
| 2002/0115448 A1 | * | 8/2002 | Amerga et al. ............ 455/456 |
| 2005/0058149 A1 | * | 3/2005 | Howe ............ 370/428 |
| 2006/0059254 A1 | * | 3/2006 | Widera et al. ............ 709/224 |

FOREIGN PATENT DOCUMENTS

| JP | 2004-140596 | 5/2004 |
|---|---|---|
| JP | 2004-221764 | 8/2004 |

* cited by examiner

*Primary Examiner*—Ricky Ngo
*Assistant Examiner*—David Oveissi
(74) *Attorney, Agent, or Firm*—Staas & Halsey, LLP

(57) ABSTRACT

An apparatus for and method of estimating a one-way delay time between two hosts and an apparatus and method of clock synchronization using the same. The two hosts are connected to a network and communicate a predetermined packet; k-th, (k+1)-th, and (k+2)-th transmission times are measured at the first host, and k-th, and (k+1)-th transmission times are measured at the second host; a time difference of the m-th transmission time is measured at the first and second host, where m is k or k+1, and by using the measured transmission times, an m-th one-way delay time is calculated. If the time difference is identical to the calculated one-way delay time, a value equal to or less than the calculated one-way delay time is determined as the estimated one-way delay time. Accordingly, the estimation error of a one-way delay time is reduced for both symmetrically and asymmetrically connected hosts.

22 Claims, 8 Drawing Sheets

ONE-WAY DELAY TIME ESTIMATION METHOD AND APPARATUS AND CLOCK SYNCHRONIZATION METHOD AND APPARATUS USING THE SAME

CROSS-REFERENCE TO RELATED PATENT APPLICATIONS

This application claims the benefit of Korean Patent Application No. 2005-112003, filed Nov. 22, 2005, in the Korean Intellectual Property Office, the disclosure of which is incorporated herein by reference.

BACKGROUND OF THE INVENTION

1. Field of the Invention

Aspects of the present invention relate to estimation of a one-way delay time between two hosts, and more particularly, to a method of and an apparatus for estimating a one-way delay time, by which if an m-th one-way delay time obtained by using a round-trip delay time is identical to the time difference of the m-th transmission times measured in respective hosts, a value equal to or less than the obtained m-th one-way delay time is determined as the one-way delay time desired to be estimated, and to a clock synchronization method and apparatus using the same.

2. Description of the Related Art

Clocks of two hosts disposed at a distance may be synchronized with each other or not. As a method of synchronizing the clocks of two hosts that are not synchronized, two hosts may receive identical timing information from a base station of a satellite or a cellular phone, and synchronize the clocks according to the received timing information. However, in this method, in order to receive the timing information, expensive reception equipment such as an antenna is necessary. Accordingly, utilization of the method is low.

As another method of synchronizing the clocks of two hosts that are not synchronized, a one half value of a round-trip delay time measured in one host may be estimated as a one-way delay time of the two hosts, and by using the estimated one-way delay time, two clocks of the hosts may be synchronized. The mid round-trip value method may be usefully employed to synchronize the clocks if two disposed hosts are under an environment where timing information from a satellite or a base station that can be a reference cannot be received. However, the mid round-trip value method has a limitation in that the accuracy of synchronization cannot be guaranteed to be higher than one half the value of the round-trip delay time. Accordingly, an improved method to overcome this limitation is needed.

SUMMARY OF THE INVENTION

An aspect of the present invention provides a method of estimating a one-way delay time, by which when an m-th one-way delay time obtained by using a round-trip delay time is identical to a time difference of the m-th transmission times measured in respective hosts, a value equal to or less than the obtained m-th one-way delay time is determined as the estimated one-way delay time, and a clock synchronization method and apparatus using the same.

An aspect of the present invention also provides an apparatus for estimating a one-way delay time, by which when an m-th one-way delay time obtained by using a round-trip delay time is identical to a time difference of the m-th transmission times measured in respective hosts, a value equal to or less than the obtained m-th one-way delay time is determined as the one-way delay time desired to be estimated, and a clock synchronization method and apparatus using the same.

An aspect of the present invention also provides a computer readable recording medium having embodied thereon a computer program for executing a method of estimating a one-way delay time, by which when an m-th one-way delay time obtained by using a round-trip delay time is identical to a time difference of m-th transmission times measured in respective hosts, a value equal to or less than the obtained m-th one-way delay time is determined as the one-way delay time desired to be estimated, and a clock synchronization method and apparatus using the same.

According to an aspect of the present invention, a method of estimating a one-way delay time between two hosts connected to a network and communicating a predetermined packet includes: measuring the k-th, (k+1)-th, and (k+2)-th transmission times at a first of the two hosts, and measuring the k-th, and (k+1)-th transmission times at a second of the two hosts, where k is a natural number; calculating a time difference of an m-th transmission time measured at the first host and the m-th transmission time measured at the second host, where m is k or k+1, and by using the one or more of the measured transmission times, calculating an m-th one-way delay time; determining whether the calculated time difference is identical to the calculated one-way delay time; and when the calculated time difference is determined to be identical to the calculated one-way delay time, determining a value equal to or less than the calculated one-way delay time, as the estimated one-way delay time.

While not required in all aspects, in the determining of the value of the one-way delay time, a one-half value of the calculated one-way delay times may be determined as the estimated one-way delay time. While not required in all aspects, the determining of the value as the one-way delay time may include: when it is determined that the calculated time difference is identical to the calculated one-way delay time, determining a not greater value of the calculated k-th one-way delay time and the calculated (k+1)-th one-way delay time; and determining the one-half value of the calculated one-way delay time that is determined to be the not greater value, as the estimated one-way delay time. While not required in all aspects, the method may further include synchronizing the two hosts by using the estimated one-way delay time.

While not required in all aspects, the method may further include changing the m-th transmission time measured at the second host into the m-th transmission time measured at the first host. While not required in all aspects, the method may further include changing the (k+1)-th transmission time measured at the second host into a value obtained by adding the k-th round-trip delay time calculated at the second host to the (k+1)-th transmission time measured at the first host, and changing the k-th transmission time measured at the second host to a value obtained by subtracting the k-th round-trip delay time calculated at the second host from the changed (k+1)-th transmission time. While not required in all aspects, in the calculating of the time difference and the m-th one-way delay time, the k-th and (k+1)-th round-trip delay times may be calculated at the first host, and the k-th round-trip delay time may be calculated at the second host, and by using the calculated round-trip delay times, the m-th one-way delay time may be calculated.

According to another aspect of the present invention, there is provided an apparatus to estimate a one-way delay time between two hosts connected to a network and communicating a predetermined packet, the apparatus including: a time measuring unit to measure the k-th, and (k+1)-th transmission times at a first of the two hosts, and to measure the k-th, and (k+1)-th transmission times at a second of the two hosts, where k is a natural number; a calculation unit to calculate a time difference between the m-th transmission time measured at the first host and the m-th transmission time measured at the second host, where m is k or (k+1), and by using the measured transmission times, to calculate the m-th one-way delay time; an examination unit to examine whether the calculated time difference is identical to the calculated one-way delay time; and a delay time estimation unit, in response to the examined result, to output a value equal to or less than the calculated one-way delay time, as the estimated one-way delay time.

According to still another aspect of the present invention, there is provided a computer readable recording medium having embodied thereon a computer program for executing a method of estimating a one-way delay time between two hosts connected to a network and communicating a predetermined packet, wherein the method includes: measuring k-th, (k+1)-th, and (k+2)-th transmission times at a first of the two hosts, and measuring the k-th, and (k+1)-th transmission times at a second of the two hosts, where k is a natural number; calculating the time difference of the m-th transmission time measured at the first host and the m-th transmission time measured at the second host, where m is k or (k+1), and by using the measured transmission times, calculating the m-th one-way delay time; determining whether the calculated time difference is identical to the calculated one-way delay time; and when the calculated time difference is determined to be identical to the calculated one-way delay time, determining a value equal to or less than the calculated one-way delay time, as the one-way delay time desired to be estimated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
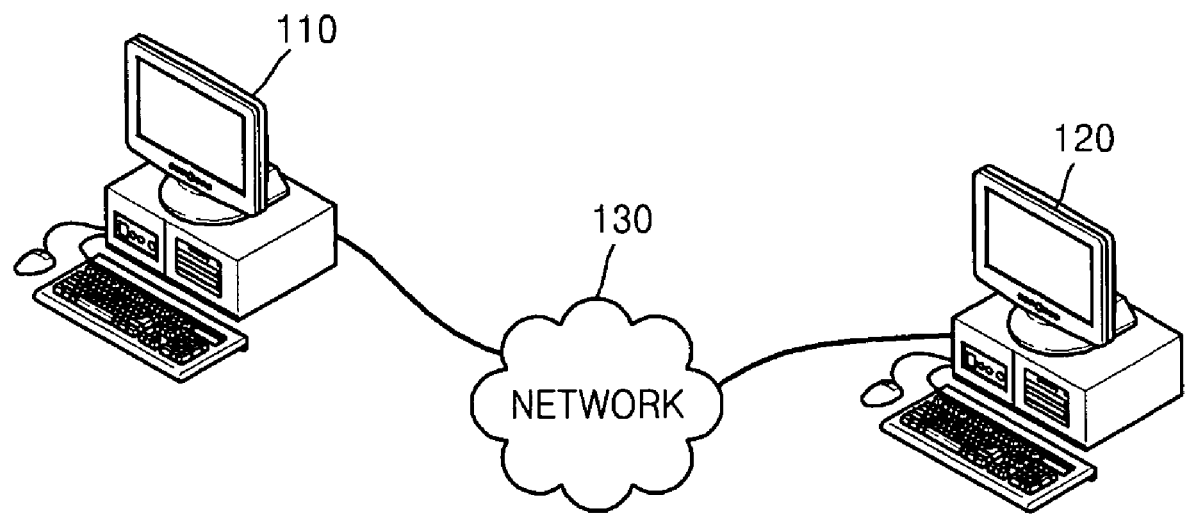
FIG. 1 illustrates a connected state of two hosts in which a one-way delay time is estimated according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a connected state of two hosts in which a one-way delay time is estimated according to an embodiment of the present invention. Referring to FIG. 1, two hosts 110 and 120 are connected to a network 130, which may be a wired network and/or a wireless network. More than two hosts may be connected to the network 130. However, since the embodiment of the present invention relates to a method of estimating a one-way delay time for transmitting data from one host to another host, the embodiment of the present invention will be explained with respect to two hosts even though more than two hosts are connected to the network 130.

In the following explanations one host will be referred to as a first host 110 and another host will be referred to as a second host 120. A "host" refers to a device having a clock, and the host may be, for example, a personal computer (PC). Alternatively, a "host" may be any device having a networking function, such as a printer, server, or wireless handheld device.

The first and second hosts 110 and 120, respectively, may be connected to the network 130 symmetrically or asymmetrically. Here, the asymmetric connection refers to a connection in which a time taken for transmitting data from the first host 110 to the second host 120 is different from a time taken for transmitting data from the second host 120 to the first host 110 even though the times are measured at the same time under a same environment.

As described above, when timing information from a satellite or a base station that may be a reference cannot be received and the accuracy of clock synchronization between two hosts cannot be guaranteed, a one-way delay time may be estimated for clock synchronization and the estimated result may be used. According to a conventional technology, a one half value of a round-trip delay time is estimated as a one-way delay time. In the embodiments of the present invention, a method to enhance the accuracy of the estimation and a method of improving the accuracy of clock synchronization are disclosed. These methods and corresponding apparatus will now be explained with reference to FIGS. 2 through 8.

Figure 2:
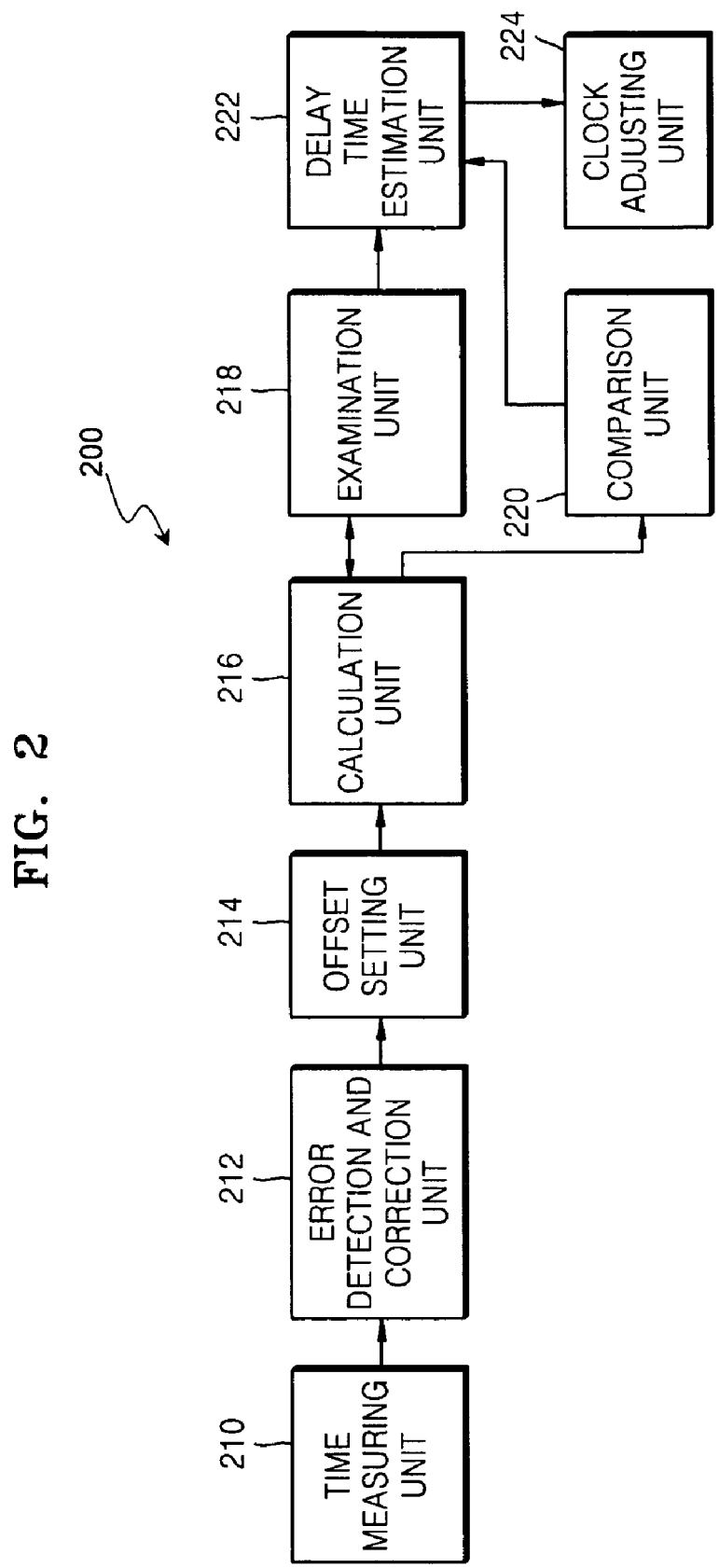
FIG. 2 is a block diagram of an apparatus for estimating a one-way delay time according to an embodiment of the present invention.

FIG. 2 is a block diagram of an apparatus 200 for estimating a one-way-delay time according to an embodiment of the present invention. The apparatus shown in FIG. 2 includes a time measuring unit 210, an error detection and correction unit 212, an offset setting unit 214, a calculation unit 216, an examination unit 218, a comparison unit 220, a delay time estimation unit 222 and a clock adjusting unit 224.

The first host 110 and the second host 120 are connected to a network and communicate data with each other. Hereinafter, the communicated data will be referred to as a packet. When the first host 110 transmits the packet to the second host 120, the second host 120 receives the packet a first one-way delay time after the first host 110 transmits the packet. The second host 120 transmits the received packet an instant after the second host 120 receives the packet. In this case, the first host 110 receives the packet a second one-way delay time after the second host 120 transmits the packet. The first host 110 again transmits the packet to the second host 120 and the process is repeated. This transmission and reception between the first host 110 and the second host/120 may be referred to as "synchronized ping-ponging".

Respective time measuring units 210 measure the k-th, (k+1)-th, and (k+2)-th transmission times at the first host 110 and the k-th, and (k+1)-th transmission times at the second host 120, where k is a natural number. Here, "transmission" may refer to only "sending" or only "receiving" or both sending and receiving according to the context. That is, the respective time measuring units 210 measure the time the first host 110 transmits a packet for the k-th time, the time the second host 120 receives/transmits the packet for the k-th time, the time the first host 110 receives/transmits the packet for the (k+1)-th time, the time the second host 120 receives/transmits the packet for the (k+1)-th time, and the time the first host 110 receives the packet for the (k+2)-th time. Here, "transmit" refers to "sending" and "receive" refers to "receiving." The respective measured transmission times of the first and second hosts are exchanged via the transmitted packet. Measuring at the first host 110 refers to measuring with a clock disposed at the first host 110 and measuring at the second host 120 refers to measuring with a clock disposed at the second host 120.

The error detection and correction unit 212 examines whether an error exists in the packet transmitted and received. That is, the error detection and correction unit 212 determines whether a lost part exists in the packet transmitted and received, and when the loss is determined to exist, the error detection and correction unit 212 corrects the loss. Accordingly, the error detection and correction unit 212 detects a packet loss and corrects the detected loss.

The offset setting unit 214 intentionally sets a positive or negative offset between the clocks of the first and second hosts 110 and 120. Whether to set a positive offset or a negative offset may be specified by a user. When the user wants to set a negative offset, the offset setting unit 214 changes the m-th transmission time, where m is k or (k+1), measured at the second host 120 with the m-th transmission time measured at the first host 110. The offset setting unit 214 may change the m-th transmission time measured at the second host 120 with a value obtained by adding a predetermined positive value ($\alpha$) to the m-th transmission time measured at the first host 110. Operation of the offset setting unit 214 setting the negative offset may be expressed as the following equation 1:

$$t_B(k) = t_A(k) + \alpha, \qquad (1)$$

where $\alpha$ is an amount of the offset and $t_A(k)$ and $t_B(k)$ are explained below. Hereinafter, a subscript A is used to indicate the first host 110 and a subscript B is used to indicate the second host 120. For example, $t_A(k)$ denotes the k-th transmission time measured at the first host 110, and $t_B(k)$ denotes the k-th transmission time measured at the second host 120. Meanwhile, $\alpha$ may be set to satisfy the following expression 2:

$$\left. \begin{array}{l} t_A(k) < t_B(k) < t_A(k+1) \text{ and} \\ t_A(k+1) < t_B(k+1) < t_A(k+2) \end{array} \right\} \qquad (2)$$

When the user wants to set a positive offset, the offset setting unit 214 changes the (k+1)-th transmission time measured at the second host 120 with a value obtained by adding the (k+1)-th transmission time measured at the first host 110 to the k-th round-trip delay time obtained in the second host 120. At this time, the offset setting unit 214 may change the (k+1)-th transmission time measured at the second host 120 to a value obtained by subtracting a predetermined positive value ($\beta$) from the added result. Operation of the offset setting unit 214 setting the positive offset may be expressed as the following equation 3:

$$t_B(k+1) = t_A(k+1) + R_B(k) - \beta, \qquad (3)$$

where $\beta$ is an amount of the offset. Here, $R_B(k)$ denotes the k-th round-trip delay time calculated at the second host 120. Meanwhile, $\beta$ may be set to satisfy the expression 2.

When the user wants to set a positive offset, the offset setting unit 214 changes the (k+1)-th transmission time measured at the second host 120 with a value obtained by adding the (k+1)-th transmission time measured at the first host 110 to the k-th round-trip delay time obtained in the second host 120. At this time, the offset setting unit 214 may change the (k+1)-th transmission time measured at the second host 120 to a value obtained by subtracting a predetermined positive value ($\beta$) from the added result. Operation of the offset setting unit 214 setting the positive offset may be expressed as the following equation 3:

$$t_B(k+1) = t_A(k+1) + R_B(k) - \beta, \qquad (3)$$

where $\beta$ is an amount of the offset. Here, $R_B(k)$ denotes the k-th round-trip delay time calculated at the second host 120. Meanwhile, $\beta$ may be set to satisfy the expression 2

Also, the offset setting unit 214 may change the k-th transmission time measured at the second host 120 to a value obtained by subtracting the k-th round-trip delay time obtained in the second host 120 from the changed (k+1)-th transmission time and may be expressed as the following equation 4:

$$t_B(k) = t_B(k+1) - R_B(k) \qquad (4)$$

Meanwhile, the round-trip delay time is a value calculated in the calculation unit 216 and is explained below. The offset setting unit 214 may receive the value of the calculated round-trip delay time from the calculation unit 216 to set a positive offset.

The meaning of the positive offset and negative offset, and the reason why the positive offset or negative offset is intentionally set in advance is explained below with reference to FIGS. 3 and 4.

The calculation unit 216 calculates the time difference of the m-th transmission time measured at the first host 110 and the m-th transmission time measured at the second host 120. Also, the calculation unit 216 calculates the m-th one-way delay time by using the measured transmission time values. More specifically, the calculation unit 216 calculates the k-th and (k+1)-th round-trip delay times at the first host 110, and the k-th round-trip delay time at the second host 120. Then, the calculation unit 216 calculates the m-th one-way delay time by using the numbers of the calculated round-trip delay time values. That is, the round-trip delay times can be expressed by the following equations 5:

$$\left. \begin{array}{l} R_A(k) = t_A(k+1) - t_A(k) \\ R_B(k) = t_B(k+1) - t_B(k) \\ R_A(k+1) = t_A(k+2) - t_A(k+1) \end{array} \right\} \qquad (5)$$

Here, $R_A(k)$ denotes the k-th round-trip delay time calculated at the first host 110, $R_B(k)$ denotes the k-th round-trip delay time calculated at the second host 120, and $R_A(k+1)$ denotes the (k+1)-th round-trip delay time calculated at the first host 110. The round-trip delay time refers to a time taken for a packet to make a round trip between the two hosts 110 and 120. Accordingly, the round-trip delay time may be calculated with respect to the first host 110 or the second host 120.

When the round trip delay time is calculated at the first host 110, the time measuring unit 210 needs to measure only two times at the first host 110. Here, the two times refer to the time when a packet is transmitted at the first host 110, and the time when the packet is received at the first host 110 after the packet is received at the second host 120 and transmitted from the second host 120. Whether the round-trip delay time is measured at the first host 110 or at the second host 120, an accurate measured value can be obtained. This is because the "round trip delay time" is the time difference of two times measured in one host and is not influenced even when clocks are not synchronized between the first host 110 and the second host 120.

Meanwhile, when the m-th one-way delay time is calculated by using the calculated round-trip delay time values, the calculation unit 216 may use the following equations 6:

$$b = \frac{R_B(k) - R_A(k)}{R_A(k+1) - R_A(k)} R_A(k) \\ a = \frac{R_A(k+1) - R_B(k)}{R_A(k+1) - R_A(k)} R_A(k) \\ b' = \frac{R_B(k) - R_A(k)}{R_A(k+1) - R_A(k)} R_A(k+1) \\ a' = \frac{R_A(k+1) - R_B(k)}{R_A(k+1) - R_A(k)} R_A(k+1)$$

(6)

Here, a denotes the k-th one-way delay time calculated at the first host 110, a' denotes the (k+1)-th one-way delay time calculated at the first host 110, b denotes the k-th one-way delay time calculated at the second host 120, and b' denotes the (k+1)-th one-way delay time calculated at the second host 120. The one-way delay time calculated at the first host 110 refers to the time taken for a packet to be transmitted from the second host 120 to the first host 110. Likewise, the one-way delay time calculated at the second host 120 refers to the time taken for a packet to be transmitted from the first host 110 to the second host 120.

It cannot be concluded that "the m-th one-way delay time calculated by the calculation unit 216" is "the one-way delay time desired to be estimated" according to aspects of the present invention. That is, the equations 6 are true only when a predetermined condition is satisfied. The predetermined condition can be expressed as the following equation 7:

$$\frac{J_A(k)}{J_B(k)} = \frac{a'-a}{b'-b}$$

(7)

$$= \frac{a'}{b'}$$

where $J_A(k) = a' - a$, and $J_B(k) = b' - b$. Here, J denotes jitter. Jitter refers to the difference of neighboring one-way delay times.

Meanwhile, the round-trip delay time is defined as the following equation 8:

$$R_A(k) = a + b \\ R_B(k) = a + b'$$

(8)

Accordingly, $R_A(k)$ and $R_B(k)$ may be expressed as in the equation 5. However, at this time, $R_B(k)$ can be expressed accurately as the following equation 9:

$$R_B(k) = t_B(k+1) - t_B(k) + \int_{t_B(k)}^{t_B(k-1)} S_A(t) dt$$

(9)

Here, S(t) denotes the difference of clock frequencies occurring as time passes. However, since the time difference between k and (k−1) is very small, $R_B(k)$ can be expressed as the equation 5.

Meanwhile, by using the equations 7 and 8, the following equations 10 can be derived:

$$J_A(k) = R_A(k+1) - R_B(k) \\ J_B(k) = R_B(k) - R_A(k)$$

(10)

Accordingly, the following equation 11 can be derived:

$$\frac{J_A(k)}{J_B(k)} = \frac{a'-a}{b'-b}$$

(11)

In order for this equation 11 to become the equation 7 described above, the following equation 12 should be satisfied:

$$\frac{a}{a'} = \frac{b}{b'}$$

(12)

Accordingly, the condition of the equation 7 is the same condition as the equation 12. By using the conditions of the equations 7 and 12, the following equations 13 and 14 can be derived:

$$\frac{a}{b} = \frac{a'}{b'}$$

(13)

$$= \frac{J_A(k)}{J_B(k)}$$

$$= \frac{R_A(k+1) - R_B(k)}{R_B(k) - R_A(k)}$$

$$\frac{a}{a'} = \frac{b}{b'}$$

(14)

$$= \frac{R_A(k)}{R_A(k+1)}$$

Accordingly, the ratio of the two values, "one-way delay time" and "jitter", that can only be measured with a less than 100% accuracy is expressed as the ratio of values, "round-trip delay times" that can be measured with a 100% accuracy.

If these equations 13 and 14 are used, the equations 6 described above are derived. Since the one-way delay times derived in the equations 6 are true only when a predetermined condition is satisfied as described above, it cannot be said to be a one-way delay time that is desired to be estimated according to the embodiment of the present invention.

Also, the user cannot know whether the predetermined condition is satisfied. Accordingly, in order to estimate a one-way delay time according to the embodiment of the present invention, the following conditions as shown in equations 15 should be satisfied. One of the four conditions of the equations 15 needs to be satisfied:

$$\left.\begin{array}{l} b = t_B(k) - t_A(k) \\ a = t_A(k+1) - t_B(k) \\ b' = t_B(k+1) - t_A(k+1) \\ a' = t_A(k+2) - t_B(k+1) \end{array}\right\} \quad (15)$$

For this, the examination unit 218 examines whether one of the conditions of the equations 15 is satisfied. The examination unit 218 does not need to examine all equations shown in the equation 15, and examination of one equation is enough. Accordingly, the examination unit 218 examines whether the calculated m-th time difference is the same as the calculated m-th one-way delay time.

The comparison unit 220 compares the calculated k-th one-way delay time and the calculated (k+1)-th one-way delay time, and outputs the smaller value of the two as a one-way delay time. That is, the comparison unit 220 outputs the smaller of the calculated k-th one-way delay time and the calculated (k+1)-th one-way delay time, as a one-way delay time, and when the calculated k-th one-way delay time and the calculated (k+1)-th one-way delay time are identical, outputs the identical value as the one-way delay time.

The delay time estimation unit 222 outputs a value equal to or less than the calculated m-th one-way delay time as the one-way delay time desired to be estimated in response to the examination result of the examination unit 218. More specifically, when the examination unit 218 determines that the equation 15 is satisfied, the delay time estimation unit 222 determines a value equal to or less than the calculated m-th one-way delay time, as the one-way delay time desired to be estimated.

More specifically again, if the examination unit 218 determines that the equation 15 is satisfied, the delay time estimation unit 222 determines a value equal to or less than the one-way delay time output from the comparison unit 220 as the one-way delay time desired to be estimated. In particular, the delay time estimation unit 222 can determine the one-half value of the one-way delay time output from the comparison unit 220 as the one-way delay time desired to be estimated. By doing so, the one-way delay time is estimated.

Meanwhile, the examination unit 218 can perform examination repeatedly by incrementing k by 1 until n k's, each k satisfying the equation 15 according to the examination result of the examination unit 218, are found. Here, n is a predetermined natural number. Then, the comparison unit 220 can output a smallest value among the examined n calculated one-way delay times, as the one-way minimum delay time. The clock adjusting unit 224 synchronizes the clocks of the two hosts by using the one-way delay time estimated in the delay time estimation unit 222.

Figure 3:
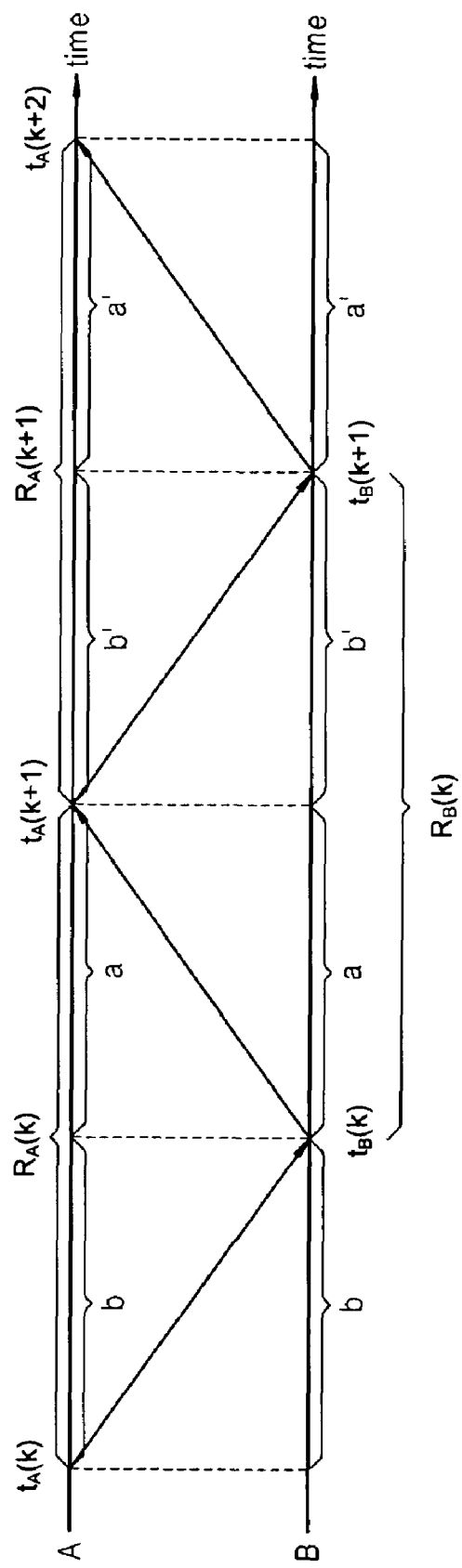
FIG. 3 is a reference diagram explaining an apparatus for estimating a one-way delay time according to an embodiment of the present invention.

FIG. 3 is a reference diagram explaining an apparatus for estimating a one-way delay time according to an embodiment of the present invention. Referring to FIG. 3, A indicates the first host 110 and B indicates the second host 120. Other symbols are the same as described with reference to FIG. 2. FIG. 3 shows a case where predetermined conditions of the equations 7 and 12 are satisfied. Meanwhile, for convenience of explanation, it is shown that the clocks of the first and second hosts 110 and 120 are synchronized with each other.

Figure 4:
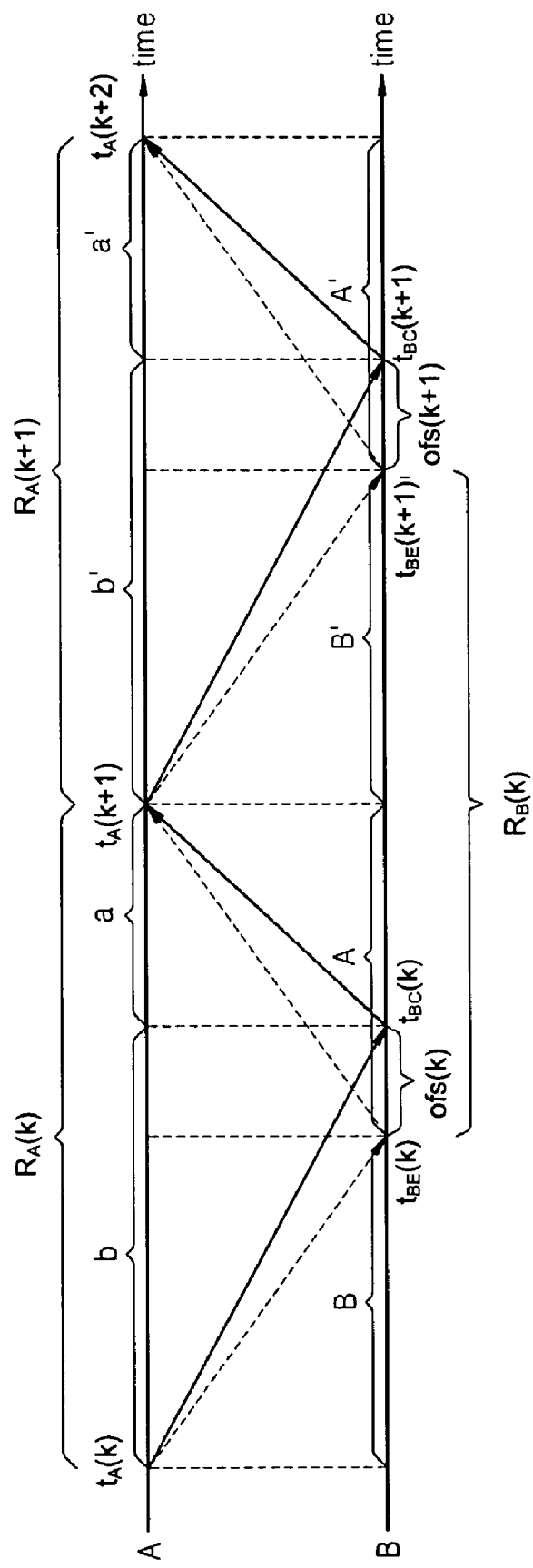
FIG. 4 is another reference diagram explaining an apparatus for estimating a one-way delay time according to an embodiment of the present invention.

FIG. 4 is another reference diagram explaining an apparatus for estimating a one-way delay time according to an embodiment of the present invention. Referring to FIG. 4, the arrows marked with dashed lines refer to the arrows shown in FIG. 3. However, $t_B(k)$ and $t_B(k+1)$ of FIG. 3 refer to $t_{BC}(k)$ and $t_{BC}(k+1)$, respectively, of FIG. 4. That is, $t_{BC}(k)$ refers to the k-th transmission time measured at the second host 120. Meanwhile, in FIG. 4, the clocks of the first and second hosts 110 and 120 are not synchronized with each other. That is, in each of $t_{BC}(k)$ and $t_{BC}(k+1)$ that are transmission times measured at the second host 120 an offset (ofs) is included.

The offsets as shown in FIG. 4 will be referred to as positive offsets. That is, if $t_{BC}(k)$ is smaller than $t_{BE}(k)$, the offset will be referred to as a negative offset. For convenience of explanation, the offset including the measured k-th transmission time will be referred to as ofs(k). Accordingly, the one-way delay time estimated by aspects of the present invention is none of a, b, a', and b', but is any one of A, B, A' and B'.

As described above, the user cannot confirm whether the predetermined conditions of the equations 7 and 12 are satisfied. However, if the equations 7 and 12 are satisfied, the equation 15 is satisfied. Accordingly, only when the examination unit 218 determines that the equation 15 is satisfied does the delay time estimation unit 222 operate. That is, when the examination result indicates that the equation 15 is satisfied with respect to the k-th transmission time, and when the offset is positive, the delay time estimation unit 222 estimates that B has a value less than b, and A has a value greater than a.

Likewise, when the examination result indicates that the equation 15 is satisfied with respect to the (k+1)-th transmission time, and when the offset is positive, the delay time estimation unit 222 can estimate that B' has a value less than b', and A' has a value greater than a'. That is, as described above, if the delay time estimation unit 222 estimates the one-way delay time as a value equal to or less than the calculated m-th one-way delay time, the estimated one-way delay time may be the time taken for the first host 110 to transmit a packet to the second host 120, or may be the time taken for the second host 120 to transmit a packet to the first host 110. When the offset is positive, as shown in FIG. 4, the present invention estimates the time taken for the first host 110 to transmit a packet to the second host 120. If the offset is negative, the present invention estimates the time taken for the second host 120 to transmit a packet to the first host 110. When the offset is positive as in FIG. 4, the delay time estimation unit 222 can estimate a value less than b (or b'), as B (or B'). In this case, the offset is estimated according to the following equations 16. Assuming that the actual offset is ofs, the estimated offset is referred to as $ofs_{estim}$.

$$\left.\begin{array}{l} ofs_{estim} = \min[b, b']/2 \text{ where } ofs > 0, \\ ofs_{estim} = -\min[a, a']/2 \text{ where } ofs < 0 \end{array}\right\} \quad (16)$$

Accordingly, an error ($E_{ofs}$) that the estimated offset may have may be obtained by subtracting the estimated offset ($ofs_{estim}$) from the actual offset (ofs). This is expressed as the following expression 17:

$$\left.\begin{array}{l} |E_{ofs}| \leq \min[b, b']/2 \text{ where } ofs > 0 \\ |E_{ofs}| \leq \min[a, a']/2 \text{ where } ofs < 0 \end{array}\right\} \quad (17)$$

Thus, the one-way delay time estimated by the delay time estimation unit 222 may vary according to whether the offset is positive or negative. However, there is no way to confirm whether the offset is positive or negative, just as there is no way to confirm whether or not the equations 7 and 12 are satisfied. Since there is no way to check whether or not the equations 7 and 12 are satisfied, whether or not the equation 15 is satisfied is examined instead. Likewise, since there is no way to confirm whether the offset is positive or negative, the offset may be intentionally initialized to be positive or negative. For intentionally initializing the offset, the apparatus for estimating a one-way delay time according to the embodiment of the present invention may have the offset setting unit 214. The operation of the offset setting unit 214 is described above with reference to FIG. 2.

Figure 5:
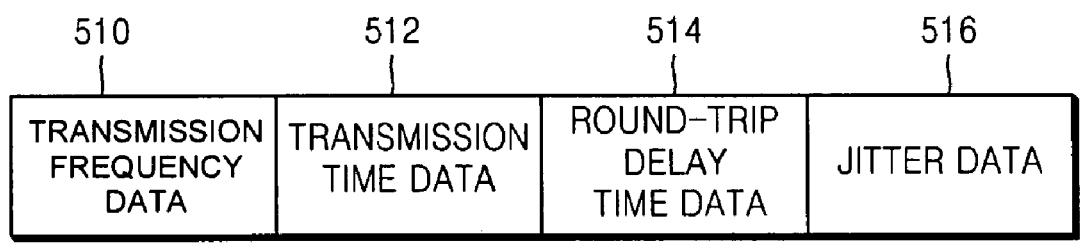
FIG. 5 illustrates an example of a structure of a packet transmitted and received between two hosts according to an embodiment of the present invention.

FIG. 5 illustrates an example of a structure of a packet transmitted and received between two hosts according to an embodiment of the present invention. Referring to FIG. 5, the packet includes transmission frequency data 510, transmission time data 512, round-trip delay time data 514, and jitter data 516. The arrangement order of the data fields shown in FIG. 5 is made for convenience of explanation and the arrangement order is not limited to the order shown in FIG. 5. The transmission frequency data 510 indicates how many times transmission between the first and second hosts 110 and 120 has been performed. The transmission time data 512 indicates a most recent measured transmission time. The round-trip delay time data 514 indicates a most recently calculated round-trip delay time. The jitter data 516 indicates a most recently calculated jitter.

Figure 6:
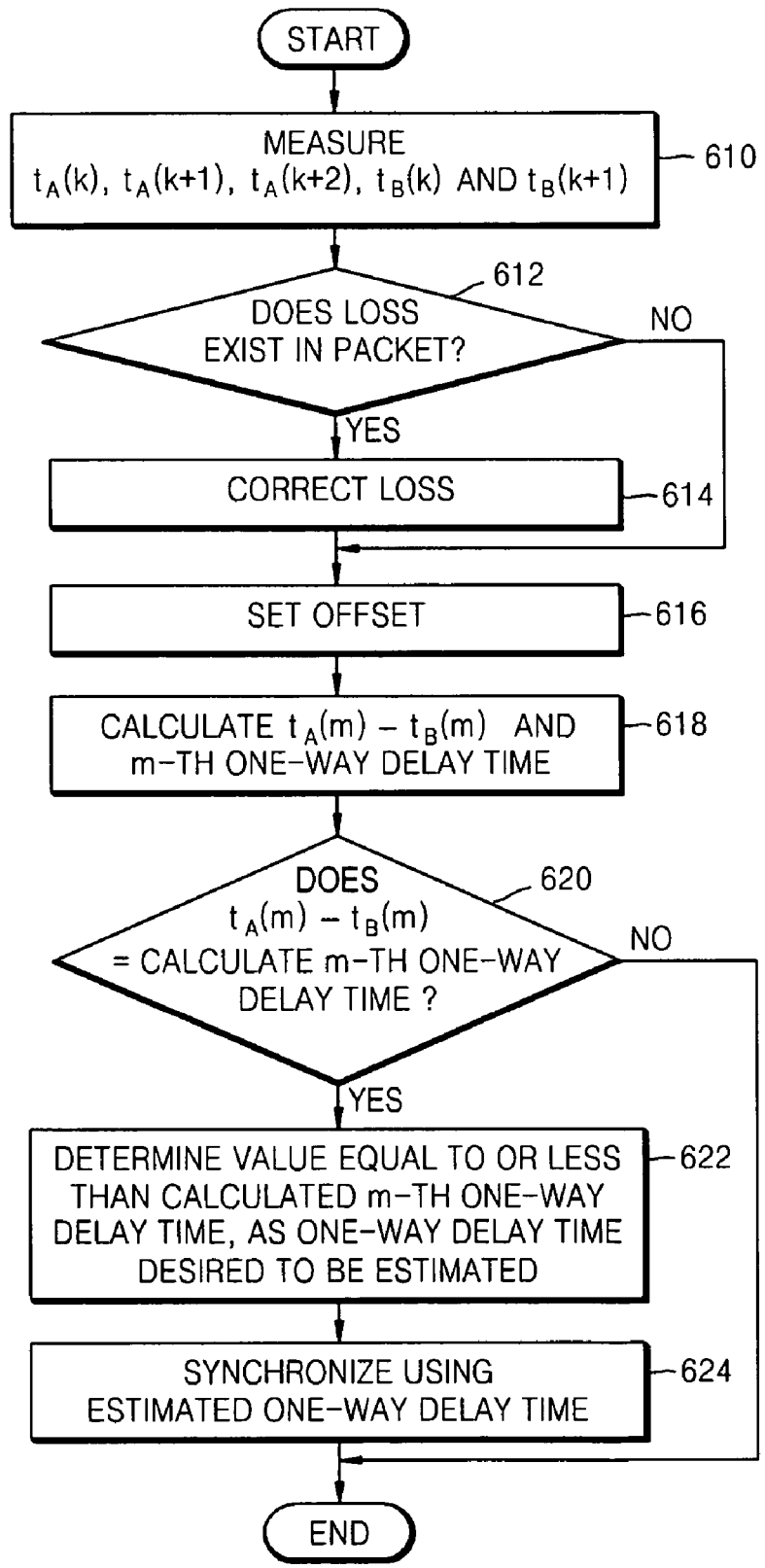
FIG. 6 is a flowchart of a method of estimating a one-way delay time according to an embodiment of the present invention.

FIG. 6 is a flowchart of a method of estimating a one-way delay time according to an embodiment of the present invention. The method includes operations 610 through 624 to determine a value equal to or less than an m-th one-way delay time, obtained by using a round-trip delay time, as an estimated one-way delay time, when the obtained m-th one-way delay time is the same as the time difference between the m-th transmission times measured at the first and second hosts 110 and 120, respectively.

The times $t_A(k)$, $t_B(k)$, $t_A(k+1)$, $t_B(k+1)$, and $t_A(k+2)$ are measured in operation 610. Operation 614 determines whether a loss exists in the packet transmitted and received between the first and second hosts 110 and 120, and if a loss is determined to exist in the packet, the loss is corrected in operation 614. After the operation 614 or after the operation 612 determines that no loss exists in the packet, an offset is set to be positive or negative in operation 616. However, whether the offset is set to be positive or negative may be selected by the user in advance.

The time difference of $t_A(m)$ and $t_B(m)$ is obtained by using the transmission times measured at the operation 610, and the m-th one-way delay time is obtained in operation 618. The m-th round-trip delay time may be obtained by using the transmission times measured at the operation 610, and by using the obtained round-trip delay time, the m-th one-way delay time may be obtained. Operation 620 determines whether the obtained time difference is the same as the obtained m-th one-way delay time. When it is determined in the operation 620 that the time difference is the same as the m-th one-way delay time, a value equal to or less than the obtained m-th one-way delay time is estimated as a one-way delay time in operation 622, and the clocks of first and second hosts 110 and 120 may be synchronized by using the estimated one-way delay time in operation 624.

Figure 7:
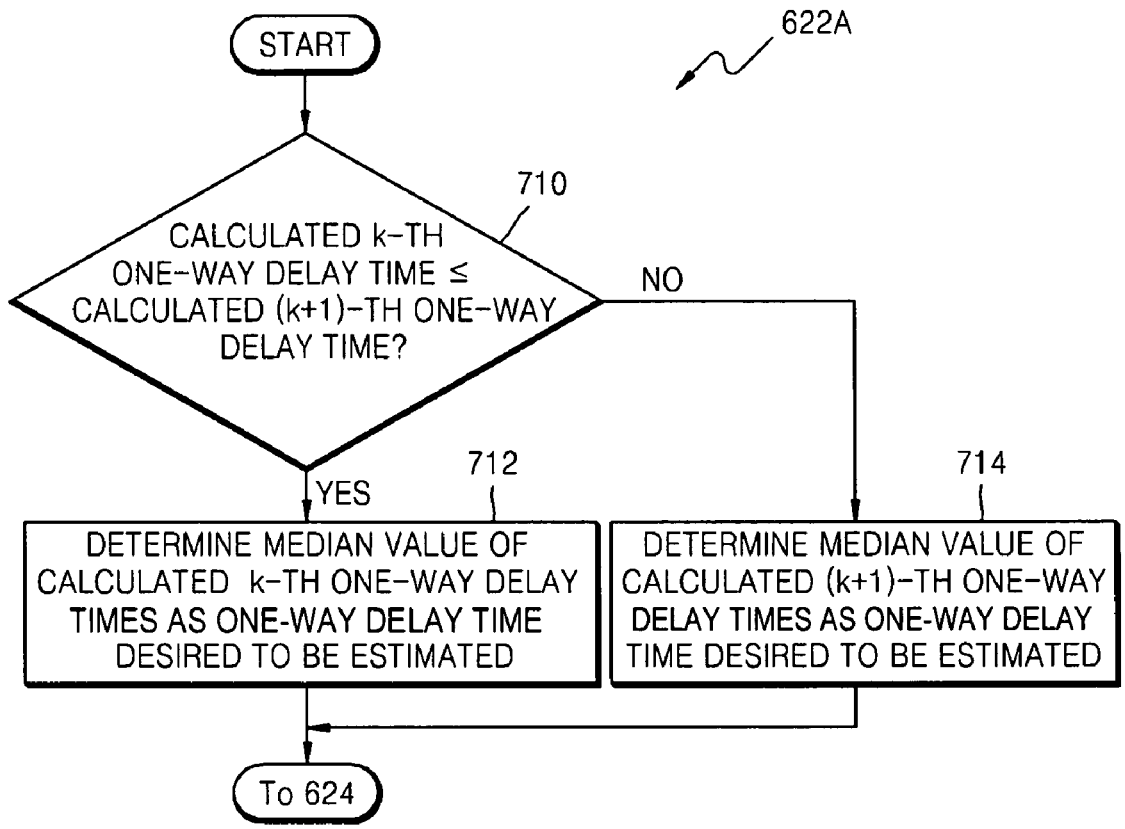
FIG. 7 is a detailed flowchart explaining operation 622 of FIG. 6 according to an embodiment of the present invention.

FIG. 7 is a detailed flowchart explaining an alternate embodiment 622A of the operation 622 shown in FIG. 6. The alternate embodiment 622A includes operations 710 through 714 to estimate a value equal to or less than the smaller of the k-th one-way delay time and the (k+1)-th one-way delay time. Operation 710 determines whether the obtained k-th one-way delay time is equal to or less than the obtained (k+1)-th one-way delay time. When it is determined in the operation 710 that the k-th one-way delay time is equal to or less than the (k+1)-th one-way delay time, the one-half value of the obtained k-th one-way delay time is estimated as a one-way delay time in operation 712. Conversely, when operation 710 determines that the k-th one-way delay time is not equal to or less than the (k+1)-th one-way delay time, the one-half value of the obtained (k+1)-th one-way delay time is estimated as a one-way delay time in operation 714.

Figure 8:
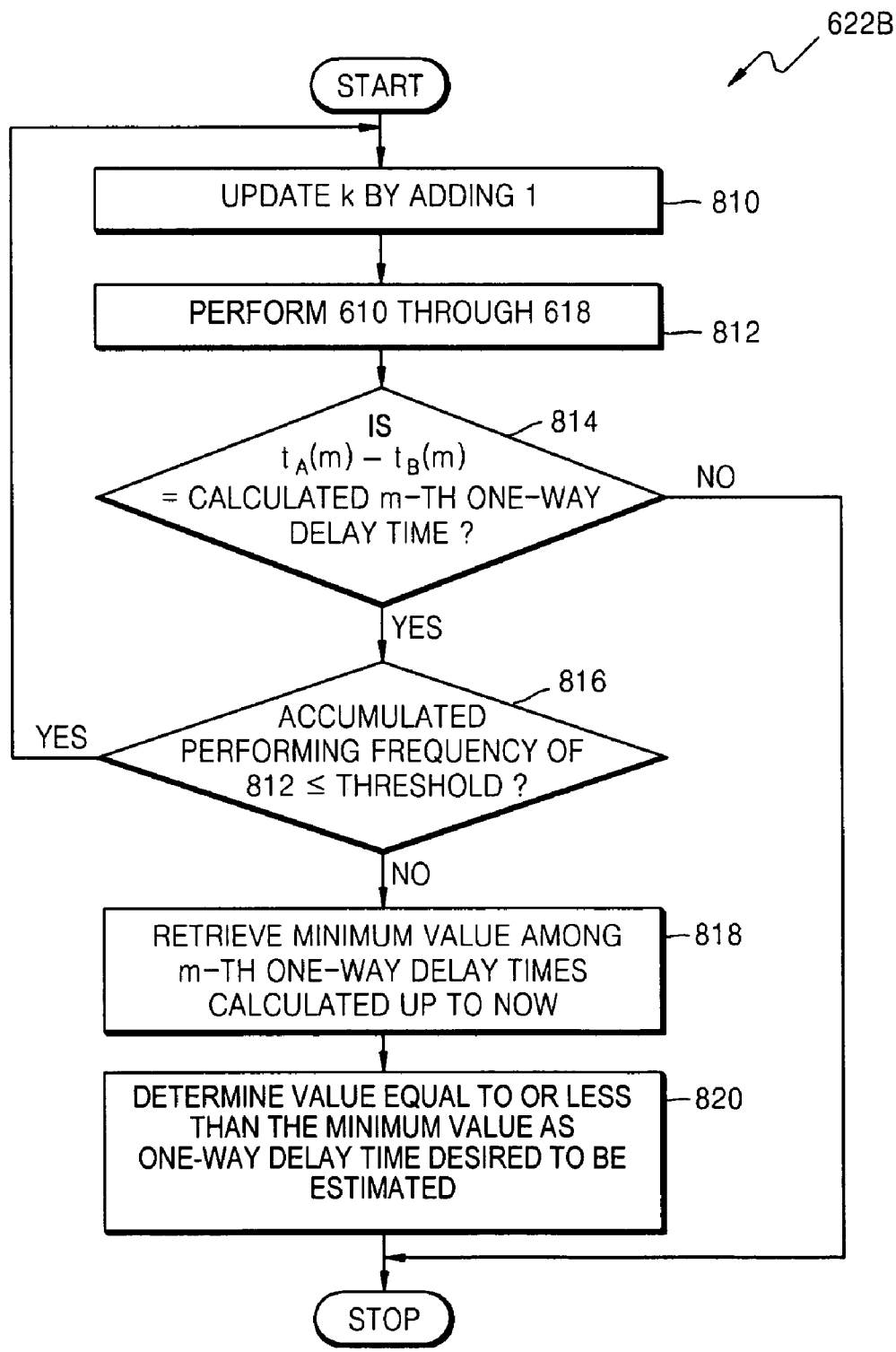
FIG. 8 is a detailed flowchart explaining operation 622 of FIG. 6 according to another embodiment of the present invention.

FIG. 8 is a detailed flowchart explaining another alternate embodiment 622B of the operation 622 shown in FIG. 6. The operation 622B includes operations 810 through 820 in which k is repeatedly incremented by 1 until a predetermined number of k's, each k satisfying the equation 15, are found. Also, a minimum value among the examined n calculated one-way delay times is searched for, and a value equal to or less than the searched minimum value, is estimated as a one-way delay time. The value k is updated by adding 1 to k in operation 810, and then, operations 610 through 618 are performed with the updated k in operation 812. Operation 814 determines whether the time difference obtained in the operation 812 is the same as "the m-th one-way delay time" in relation to the updated k. When it is determined in the operation 814 that the time difference is the same as the m-th one-way delay time, operation 816 determines whether the accumulated performing frequency in the operation 812 is equal to or less than a preset threshold. When operation 816 determines that the frequency is equal to or less than the threshold, the operation 810 is performed. However, when the operation 816 determines that the frequency is not equal to or less than the threshold, operation 818 searches for a minimum value among the m-th one-way delay times previously obtained. After the operation 818, the value equal to or less than the minimum value is estimated as a one-way delay time in operation 820.

Aspects of the present invention can also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable codes may also be distributed over a network coupled computer systems so that the computer readable code is stored and executed in a distributed fashion. Aspects of the present invention may also be embodied as a computer data signal embodied in a carrier wave and transmitted through a transmission medium, such as for example, the internet. Also, functional programs, codes, and code segments for accomplishing the present invention can be easily construed by programmers skilled in the art to which the present invention pertains.

According to the one-way delay time estimation and the clock synchronization method and apparatus using the estimation according to the embodiments of the present invention, the estimation error is less than that of the conventional estimation of a one-way delay time, and even when two hosts are connected asymmetrically, the one-way delay time may be estimated. Furthermore, according to the one-way delay time estimation and the clock synchronization method and apparatus using the estimation according to the embodiments of the present invention, a one-way delay time can be estimated regardless of the type of layer in which the two respective hosts are disposed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of estimating a one-way delay time between first and second hosts connected to a network and communicating a predetermined packet, the method comprising:
    measuring k-th, (k+1)-th, and (k+2)-th transmission times of the packet at the first host, using a clock of the first host, and measuring k-th, and (k+1)-th transmission times of the packet at the second host, using a clock of the second host;
    calculating a time difference between the m-th transmission time measured at the first host and the m-th transmission time measured at the second host, where m is k or k+1;
    using one or more of the measured transmission times, to calculate k-th and (k+1)-th round-trip delay times at the first host, and a k-th round-trip delay time at the second host;
    calculating one or more m-th one-way delay times, using the round-trip delay times;
    determining whether the calculated time difference is identical to the calculated one-way delay times; and
    when the calculated time difference is determined to be identical to the calculated one-way delay times, determining a value equal to or less than the calculated one-way delay times, as the estimated one-way delay time; and
    synchronizing the clocks of the first and second hosts using the estimated one-way delay time.

2. The method of claim 1, wherein in the determining of the value as the one-way delay time, a one-half value of the calculated one-way delay time is determined as the estimated one-way delay time.

3. The method of claim 1, wherein the determining of the value as the one-way delay time comprises:
    when the calculated time difference is determined to be identical to the calculated one-way delay time,
    determining a one-half value of the lowest calculated m-th one-way delay time, as the estimated one-way delay time.

4. The method of claim 1, wherein the first host is disposed in a different layer than the second host.

5. The method of claim 1, further comprising: changing the m-th transmission time measured at the second host into the m-th transmission time measured at the first host.

6. The method of claim 5, wherein in the changing of the m-th transmission time measured at the second host, the m-th transmission time measured at the second host is changed to a value obtained by adding a predetermined positive value to the m-th transmission time measured at the first host.

7. The method of claim 1, further comprising: determining whether a loss exists in the packet, and if the loss exists in the packet, correcting the loss.

8. The method of claim 1, further comprising:
    incrementing k by 1 to a predetermined value;
    calculating the time difference and the m-th one-way delay time at each increment of k; and
    determining a minimum value of the calculated m-th one-way delay times as the estimated one-way delay time.

9. An apparatus to estimate a one-way delay time between first and second hosts connected to a network and communicating a predetermined packet, the apparatus comprising:
    a time measuring unit to measure k-th, (k+1)-th, and (k+2)-th transmission times at the first host, and to measure k-th, and (k+1)-th transmission times at the second host;
    a calculation unit to calculate a time difference of the m-th-transmission time measured at the first host and the m-th transmission time measured at the second host, where m is k or k+1, to calculate k-th round-trip delay times at the first host, and a k-th round-trip delay time at the second host, by using the measured transmission times, and to calculate one or more m-th one-way delay times, by using the round-trip delay times;
    an examination unit to examine whether the calculated time difference is identical to the calculated one-way delay times;
    a delay time estimation unit, to output a value equal to or less than the smallest calculated one-way delay time, as the estimated one-way delay time, in response to the examined result; and
    a clock adjusting unit to synchronize the two hosts using the estimated one-way delay time.

10. The apparatus of claim 9, wherein the delay time estimation unit outputs a one-half value of the smallest calculated one-way delay time, as the estimated one-way delay time.

11. The apparatus of claim 10, further comprising:
    a comparison unit to compare the calculated m-th one-way delay times, and to output a value that is a not greater value of the compared one-way delay times, as a one-way minimum delay time,
    wherein the delay time estimation unit outputs a one-half value of the one-way minimum delay time as the estimated one-way delay time.

12. The apparatus of claim 9, further comprising:
    an offset setting unit to change the m-th transmission time measured at the second host into the m-th transmission time measured at the first host.

13. The apparatus of claim 12, wherein the offset setting unit changes the m-th transmission time measured at the second host into a value obtained by adding a predetermined positive value to the m-th transmission time measured at the first host.

14. The apparatus of claim 9, further comprising
    an offset setting unit to change the (k+1)-th transmission time measured at the second host into a value obtained by adding the k-th round-trip delay time calculated at the second host to the (k+1)-th transmission time measured at the first host, and changing the k-th transmission time measured at the second host to a value obtained by subtracting the k-th round-trip delay time calculated at the second host from the changed (k+1)-th transmission time.

15. The apparatus of claim 14, wherein:
    the offset setting unit changes the (k+1)-th transmission time measured at the second host into a value obtained by subtracting a predetermined positive value from the addition result.

16. The apparatus of claim 9, further comprising:
    an error detection and correction unit to detect a loss in the packet, and to correct the detected loss.

17. The apparatus of claim 9, wherein the predetermined packet comprises:
    a transmission frequency data to count a number of times the transmission is performed;
    a transmission time data to record a most recently measured transmission time;
    a round-trip delay time data to record a most recently measured round-trip time; and
    a jitter data to record the most recent jitter.

18. A computer readable recording medium having embodied thereon a computer program for executing a method of estimating a one-way delay time between first and second hosts connected to a network and communicating a predetermined packet, wherein the method comprises:
measuring k-th, (k+1)-th, and (k+2)-th transmission times at the first host, using a clock of the first host, and measuring the k-th, and (k+1)-th transmission times at the second host, using a clock at the second hose;
calculating a time difference of the m-th transmission time measured at the first host and the m-th transmission time measured at the second host, where m is k or k+1;
using the measured transmission times to calculate k-th and (k+1)-th round-trip delay times at the first host, and a k-th round-trip delay time at the second host; and
calculating one or more m-th one-way delay times using to the round-trip delay times;
determining whether the calculated time difference is identical to the calculated one-way delay times;
when the calculated time difference is determined to be identical to the calculated one-way delay times, determining a value equal to or less than the calculated one-way delay times, as the estimated one-way delay time; and
synchronizing the clocks of the first and second hosts using the estimated one-way delay time.

19. A method of estimating a one-way delay time between first and second hosts connected to a network and communicating a predetermined packet, the method comprising:
measuring a difference between successive sequential transmit times of the packet at the first and second hosts, using clocks of the first and second hosts, to obtain a time difference;
calculating a one-way delay time, by using one or more of the sequential transmit times;
comparing the time difference to the calculated one-way delay time;
when the time difference is determined to be identical to the calculated one-way delay time, determining a value equal to or less than the calculated one-way delay time, as the estimated one-way delay time; and
synchronizing the first and second hosts using the estimated one-way delay time.

20. The method of claim 19, wherein the calculating of the one-way delay time comprises:
calculating two successive sequential round-trip delay times at the first host, and calculating a round-trip delay time at the second host, wherein the round-trip delay time at the second host occurs between the beginning and the end of the two successive sequential round-trip delay times at the first host; and
by using the calculated round-trip delay times, the one-way delay time is calculated.

21. A method of estimating a one-way delay time between first and second hosts connected to a network and communicating a predetermined packet, the method comprising:
measuring first, second, and third transmission times of the packet at the first host, using a clock of the first host, and measuring first and second transmission times of the packet at the second host, using a clock of the second host;
calculating a time difference between the first transmission time measured at the first host and the first transmission time measured at the second host or the second transmission time measured at the first host and the second transmission time measured at the second host;
using one or more of the measured transmission times to calculate first and second round-trip delay times at the first host and a first round-trip delay time at the second host, and using the calculated round-trip delay times to calculate a one-way delay time;
determining whether the calculated time difference is identical to the calculated one-way delay time;
when the calculated time difference is determined to be identical to the calculated one-way delay time, determining a value equal to or less than the calculated one-way delay time, as the estimated one-way delay time, and
synchronizing the first and second hosts using the estimated one-way delay time,
wherein the calculating of the one-way delay time further comprises:
calculating first and second round-trip delay times at the first host, and calculating a first round-trip delay time at the second host; and
by using the calculated round trip delay times, the one-way delay time.

22. The method of claim 1, wherein the one or more m-th one-way delay times are calculated using, $$a = \frac{R_A(k+1) - R_B(k)}{R_A(k+1) - R_A(k)} R_A(k),$$

$$b = \frac{R_B(k) - R_A(k)}{R_A(k+1) - R_A(k)} R_A(k),$$

$$a' = \frac{R_A(k+1) - R_B(k)}{R_A(k+1) - R_A(k)} R_A(k+1), \text{ and}$$

$$b' = \frac{R_B(k) - R_A(k)}{R_A(k+1) - R_A(k)} R_A(k+1),$$

wherein a is a k-th one-way delay time calculated at the first host, $R_A(k)$ is the k-th round-trip delay time calculated at the first host, $R_B(k)$ is the k-th round-trip delay time calculated at the first host, b is the k-th one-way delay time calculated at the second host, a' is the (k+1)-th one-way delay time calculated at the first host, b' is a (k+1)-th one-way delay calculated at the second host, and the round-trip delay time is a time taken for the packet to make a round trip between the first host and the second host.

* * * * *

UNITED STATES PATENT AND TRADEMARK OFFICE
CERTIFICATE OF CORRECTION

PATENT NO. : 7,720,109 B2  Page 1 of 1
APPLICATION NO. : 11/601759
DATED : May 18, 2010
INVENTOR(S) : Dong-keun Kim et al.

It is certified that error appears in the above-identified patent and that said Letters Patent is hereby corrected as shown below:

Column 14, Line 5, change "m-th-transmission" to --m-th transmission--.

Column 15, Line 9, change "hose;" to --host;--.

Column 16, Line 21-22, change "time, and" to --time; and--.

Signed and Sealed this

Seventeenth Day of August, 2010

David J. Kappos
*Director of the United States Patent and Trademark Office*